US007380324B2

(12) United States Patent
Young

(10) Patent No.: US 7,380,324 B2
(45) Date of Patent: Jun. 3, 2008

(54) GEAR PULLER JAW

(75) Inventor: Richard D. Young, Indianapolis, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/943,366

(22) Filed: Sep. 17, 2004

(65) Prior Publication Data

US 2005/0086785 A1 Apr. 28, 2005

Related U.S. Application Data

(60) Provisional application No. 60/503,690, filed on Sep. 17, 2003.

(51) Int. Cl.
*B23P 19/04* (2006.01)

(52) U.S. Cl. ............................ 29/259; 29/255; 29/239; 29/426.5

(58) Field of Classification Search .................. 29/259, 29/255–258, 278, 270, 263, 239, 426.5
See application file for complete search history.

(56) References Cited

U.S. PATENT DOCUMENTS 1,026,548 A 5/1912 Allien
1,064,400 A 6/1913 Timmins
1,227,457 A 5/1917 Langan
1,258,699 A 3/1918 Neumaier
1,310,447 A 7/1919 Schilling
1,343,661 A 6/1920 Crim et al.
1,352,990 A 9/1920 Reinker
1,368,760 A 2/1921 Schilling
1,381,142 A 6/1921 Staley
1,394,129 A 10/1921 Wickersham
1,409,506 A 3/1922 Willis
1,417,265 A 5/1922 McClarran
1,435,397 A 11/1922 Hunt
1,439,611 A 12/1922 Coston
1,446,918 A 2/1923 Mielke
1,447,768 A 3/1923 Dover et al.
1,456,735 A 5/1923 Hunt
1,457,841 A 6/1923 Johnson
1,462,437 A 7/1923 Young
1,470,310 A 10/1923 Winchell
1,478,648 A 12/1923 Grahek
1,485,733 A 3/1924 Sterling et al.
1,494,832 A 5/1924 Grant
1,522,983 A 1/1925 Strassner
1,559,885 A 11/1925 Kelley
1,566,673 A 12/1925 Heinrich
1,584,855 A 5/1926 Eisenhuth
1,607,592 A 11/1926 Marciano et al.
1,631,872 A 6/1927 Knight
1,644,839 A 10/1927 Landrum
1,708,355 A 4/1929 Chipman
1,709,913 A 4/1929 Kaplan
1,715,506 A 6/1929 Livesay
1,721,189 A 7/1929 Schekall et al.
1,787,016 A 12/1930 Opel (Continued)

*Primary Examiner*—Lee D Wilson
(74) *Attorney, Agent, or Firm*—Sawyer Law Group, LLP

(57) ABSTRACT

Apparatus and methods for removing a gear from a shaft. In one embodiment, the invention includes a slotted gear puller which engages the web of a gear and can be used to pull the gear from the shaft based on engagement of the gear puller with the gear in the area of the web of the gear.

11 Claims, 9 Drawing Sheets

U.S. PATENT DOCUMENTS 1,787,070 A 12/1930 Hainsworth
1,828,252 A 10/1931 Lynch
1,866,654 A 7/1932 Kulp et al.
1,879,331 A 9/1932 Kulp et al.
2,003,648 A 6/1935 Frye et al.
2,052,534 A 8/1936 Quarles
2,077,254 A 4/1937 Nestler
2,161,227 A 6/1939 Houston
2,252,036 A 8/1941 Rummer
2,468,970 A 5/1949 Gilbertson
2,834,100 A 5/1958 Harsh
2,872,728 A 2/1959 Fraser
2,992,478 A 7/1961 Baker
3,146,522 A 9/1964 Wright
3,200,483 A 8/1965 Menegoni
3,372,457 A * 3/1968 Selby et al. .................. 29/259
3,689,978 A 9/1972 Kelso
3,696,496 A 10/1972 Corder
3,781,963 A 1/1974 Felser, Jr.
3,908,258 A 9/1975 Barty
4,034,458 A 7/1977 Ford et al.
4,042,139 A 8/1977 Pernsteiner et al.
4,167,057 A 9/1979 Traynor
4,210,990 A 7/1980 Krieger
4,492,014 A 1/1985 Alexander
4,562,631 A 1/1986 Welch
4,864,709 A 9/1989 Klucz et al.
4,868,965 A 9/1989 Drymon
4,989,311 A 2/1991 Rosin
5,243,749 A 9/1993 Shultz
5,247,727 A 9/1993 Harris et al.
5,257,445 A 11/1993 Mayberry
5,279,881 A * 1/1994 Kotani ........................ 428/141
5,333,378 A 8/1994 Sjöbom
5,349,736 A 9/1994 Rubino et al.
5,727,298 A * 3/1998 Strong ......................... 29/259
5,894,650 A 4/1999 Barenburg
5,983,474 A 11/1999 Koppe
5,991,994 A 11/1999 Crews
6,012,211 A 1/2000 Ochoa et al.
6,266,859 B1 7/2001 Hernandez
6,305,061 B1 10/2001 King
6,415,491 B1 * 7/2002 Klann ......................... 29/259
6,502,293 B1 1/2003 Khurana
6,536,088 B1 3/2003 Chiang
6,581,265 B2 6/2003 Sawaya
2002/0178564 A1 12/2002 Crawford
2005/0086785 A1 * 4/2005 Young ....................... 29/426.5

* cited by examiner

GEAR PULLER JAW

CROSS REFERENCE TO RELATED APPLICATIONS

The present invention claims the benefit of priority to U.S. Provisional Patent Application Ser. No. 60/503,690, filed Sep. 17, 2003, which is incorporated herein by reference.

FIELD OF THE INVENTION

The present invention relates to methods and apparatus for removing a component that is attached to another component, and in particular for removing a press-fit gear from a shaft.

BACKGROUND OF THE INVENTION

Service technicians needed a fast, effective, method for pulling a press fit gear from a shaft without having to partially, or fully remove the shaft. Some removal methods and apparatus require that the shaft be partially removed (for example, slid forward one journal) in order to remove the gear. Although the gear removal apparatus and methods described in this document were developed for removal of a camshaft gear from a diesel engine, the features of various embodiments of the invention described herein are potentially applicable to any press fit component, especially those components including one or more surface features suitable for use with the types of component clamping described herein and their equivalents.

SUMMARY OF THE INVENTION

An apparatus for removing a gear, the apparatus includes an attachment member which rotates in order to slide into a fitting relationship with the web of a gear. The apparatus also includes a pilot member for reacting the loads of the lugs of the attachment member when the gear in being pulled.

In yet another aspect of some embodiments of the present invention pertains to an attachment member which includes a plurality of fingers which can be inserted through and rotated behind corresponding apertures in the web of the gear. There is also a plurality of sliding pins which assist in coupling the attachment member to the gear web.

Another aspect of some embodiments of the present invention relate to a method for removing a gear from a shaft. The method includes inserting a plurality of lugs through the apertures of the gear, rotating the lugs in unison so that they are in contact with the gear web, and pulling the gear web by the lugs to remove the gear from the shaft.

These and other aspects of the present invention will be apparent from the drawings, claims, and text to follow.

DESCRIPTION OF PREFERRED EMBODIMENT

For the purposes of promoting an understanding of the principles of the invention, reference will now be made to the embodiments and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

All drawings shown herein are scaled drawings. Further, some of the drawings include dimensions (in centimeters), as well as tolerancing information. It is understood that these specific dimensions and tolerances are one embodiment of the present invention, and the invention contemplates apparatus of different sizes and shapes.

Figure 1:
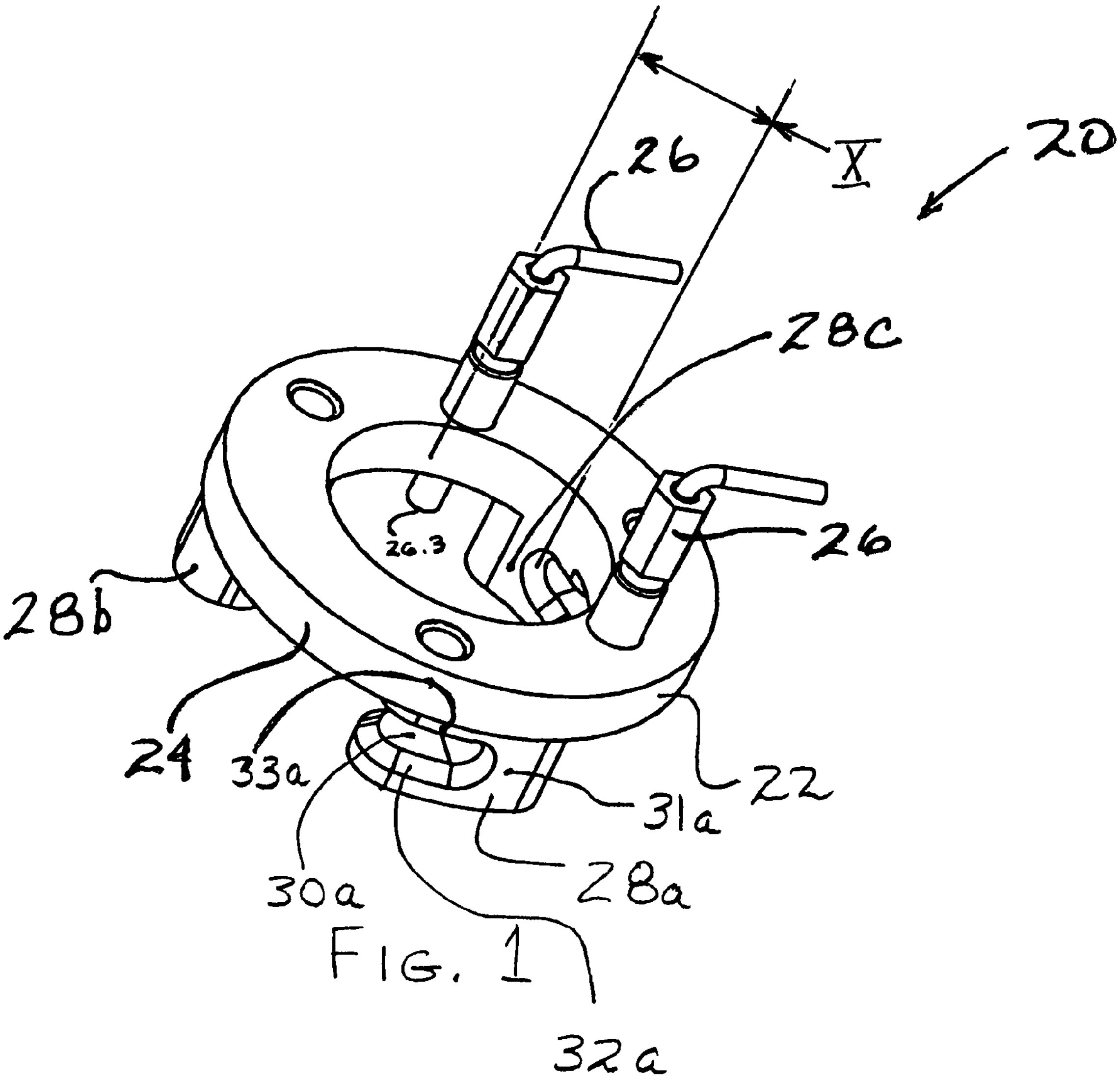
FIG. 1 is a top and side perspective view of a gear puller assembly according to one embodiment of the present invention.

Referring to FIG. 1, a gear removal assembly 20 is shown in perspective view. Assembly 20 includes a generally cylindrical gear attachment member 22. Gear attachment member 22 comprises a cylindrical faceplate 24 with three, finger-shaped, gear mounting lugs 28*a*, 28*b*, and 28*c* extending from one side of the faceplate. A pair of spring loaded plungers 26 are shown threadably engaged into faceplate 24. Although two plunger assemblies 26 are shown and described, it is understood that the present invention contemplates a single plunger, and also contemplates as many plungers as there are lugs.

Figure 2:
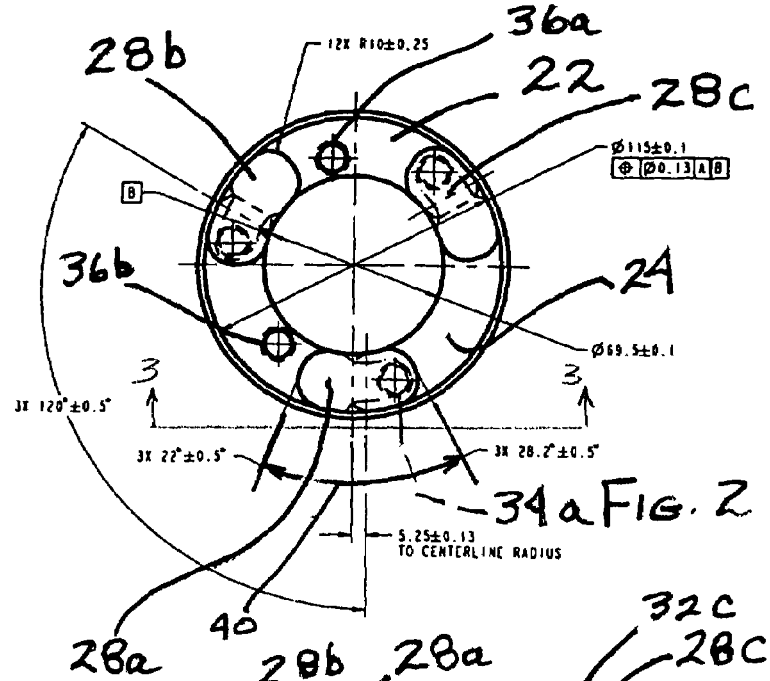
FIG. 2 is a bottom plan view of a gear coupling member according to one embodiment of the present invention.
Figure 3:
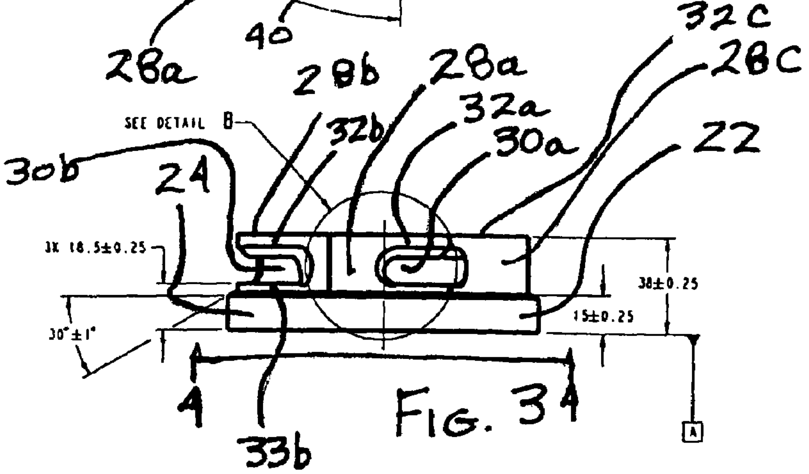
FIG. 3 is a view of the apparatus of FIG. 2 as taken along the line 3-3 of FIG. 2.
Figure 4:
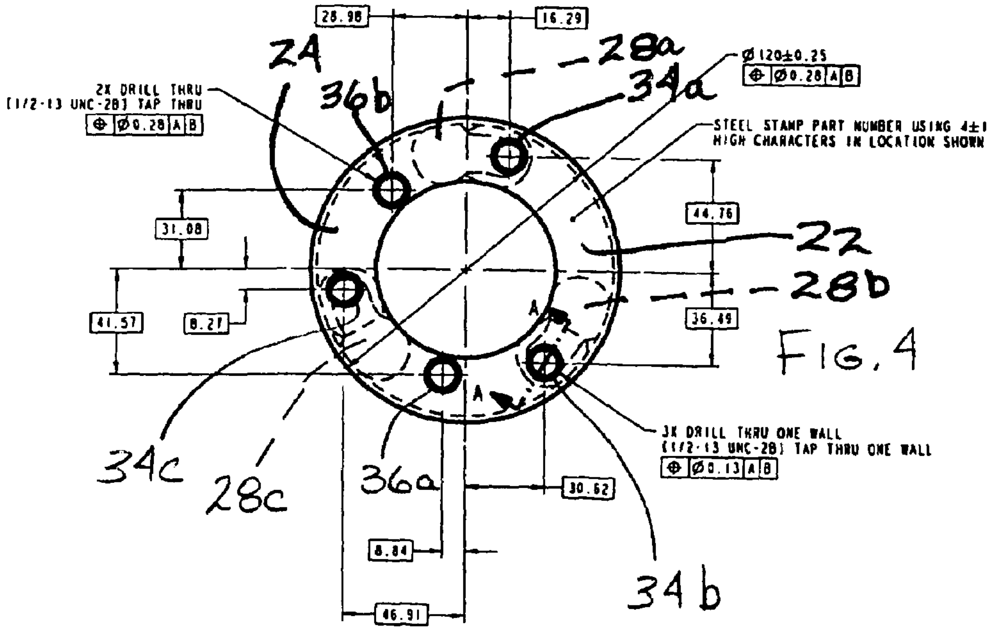
FIG. 4 is a view of the apparatus of FIG. 3 as taken along the line 4-4 of FIG. 3.

Referring to FIGS. 2-4, various orthogonal views of a gear attachment member according to one embodiment of the present invention are shown. FIG. 2 shows a bottom plan view of member 22. Threaded holes 36*a* and 36*b* extend through the thickness of faceplate 24. Mounting lugs 28*a*, 28*b*, and 28*c* are equally spaced around an annular bottom-side face of faceplate 24. Even though equal spacing of the mounting lugs has been shown and described, the present invention contemplates lugs arranged in any spacing. Preferably, the lugs are spaced corresponding to the apertures or lightening holes in the web of the gear to be pulled. Since in many gears the lightening holes are equally spaced, in some embodiments of the present invention the lugs are evenly spaced.

Figure 5:
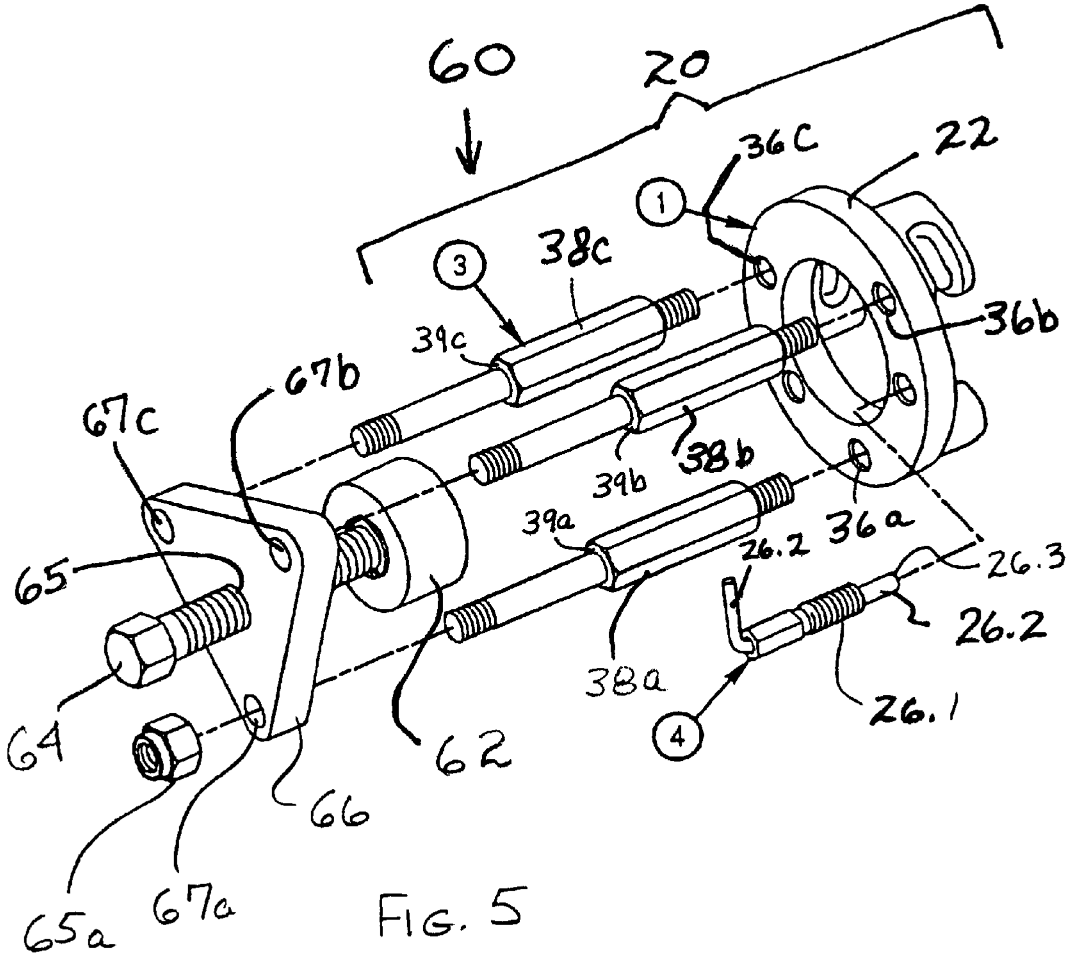
FIG. 5 is a side and front exploded perspective view of a gear pulling assembly according to one embodiment of the present invention prior to attachment to a gear.

Referring to FIG. 3, a side view of member 22 is shown. As best seen in FIGS. 1, 3, and 5, each mounting lug 28 includes a corresponding slot 30 defined between the back face of faceplate 24 and a corresponding clamping face 32 of the lug. For instance, mounting lug 28*b* includes a slot 30*b* defined between the back face of faceplate 24 and an opposing, clamping face 32*b*. As best seen in FIG. 1 with respect to mounting lug 28*a,* each lug is preferably unitary with faceplate 24, with a transition section 31 a extending from the bottom face of faceplate 24, transition section 31 being integral with clamping face 32. As best seen in FIGS. 1 and 3, each attachment lug 28 may also include a raised step face 33 that extends upward slightly from the back face faceplate 24. Slots 30*a,* 30*b,* and 30*c* are adapted and configured to mate with corresponding features of the component being removed. In a preferred embodiment, gear attachment member 22 is a single, unitary piece which can be fabricated as a casting, or as multiple pieces which are then fastening together, adhered together, or welded or brazed together. By fabricated attachment member 22 into a single piece, it is easier to maintain close tolerances in the shape of the lugs and slots so as to minimize any damage to the gear web.

Referring to FIG. 4, a front plan view of faceplate 24 is shown. A plurality of threaded attachment holes 34*a,* 34*b,* and 34*c* extend from the front side of faceplate 24 through the faceplate to the bottom side of faceplate 24. As best seen in comparing FIGS. 2, 3, and 4, it is seen that threaded hole 34*a* breaks into the one side of mounting lug 31*a* (i.e., threaded hole 34*a* breaks into slot 30*a*). Threaded holes 34*a,* 34*b,* and 34*c* are spaced around the annular volume of faceplate 24, and are registered with the corresponding slots 30*a,* 30*b,* and 30*c,* respectively.

Referring to FIG. 5, there is shown a gear pulling assembly 60 according to one embodiment of the present invention. Assembly 60 preferably includes gear removal assembly 20. Assembly 60 further includes threaded studs 30*a,* 30*b,* and 30*c* which are threadably coupled to the corresponding hole 36*a,* 36*b,* and 36*c,* respectively, of member 22. Each stud 38 is preferably threaded on each end. Further, the intermediate section between threaded portions preferably includes an outer surface adapted and configured for interfacing with a common tool, such as a hex-shaped outer surface. In some embodiments, each stud includes a first shoulder 39*a,* 39*b,* or 39*c,* respectively, which provides stand-off support for the screw member 66. These shoulders are spaced along the length of the corresponding stud so as to establish a minimum position between attachment member 22 to allow sufficient access and visibility to pilot 62.

Assembly 60 further includes a replacer screw member 66, which in one embodiment has a triangular shape. Further, replacer screw member 66 includes smooth-bore through-holes 67*a,* 67*b,* and 67*c* which are sized to receive therethrough a threaded end of the corresponding stud 38. Member 66 preferably includes a threaded through-hole 65 which threadably receives a fastener 64. A pilot member 62 is threadably coupled to the end of fastener 64. It will be appreciated that in some embodiments of the present invention it is not necessary to include studs and a screw member 66 which are threadably attachable to attachment member 22. In these embodiments, pilot member 62 is threadably coupled to one or more integral features of the gear attachment member.

From FIG. 5, which is shown in exploded view, it can be appreciated that replacer screw member 66 is slidingly received on one end of the studs 38. A fastener 67*a,* 67*b,* or 67*c,* (such as a nut) is fastened onto a threaded end of the corresponding shaft 38*a,* 38*b,* or 38*c,* respectively. With nuts 65*a,* 65*b,* and 65*c* coupled to the corresponding end of the stud 38*a,* 38*b,* or 38*c,* respectively, member 66 is constrained from being removed from the studs, but is able to slidingly move toward attachment member 22.

As best seen in FIGS. 1 and 5, assembly 20 preferably includes at least one spring-loaded plunger 26. Referring to FIG. 5, as one example, each spring-loaded plunger 26 includes a threaded body portion 26.1, an "L"-shaped plunger 26.2, and an internal spring (not shown) which urges plunger 26.2 toward member 22 (as best seen in FIG. 5). Each plunger body 26.1 is threaded and received within a corresponding hole 36*a* or 36*b* (as best seen in FIG. 2). Referring again to FIG. 5, body 26.1 further includes a hex-shaped end suitable for wrenching. In a preferred embodiment, each plunger 26 is spaced apart from the closed end of the slot of an adjacent lug by a distance X (see FIG. 1). This spacing X is chosen to be a distance that is less than the width of the gear aperture through which the adjacent lug is being positioned.

Figure 6:
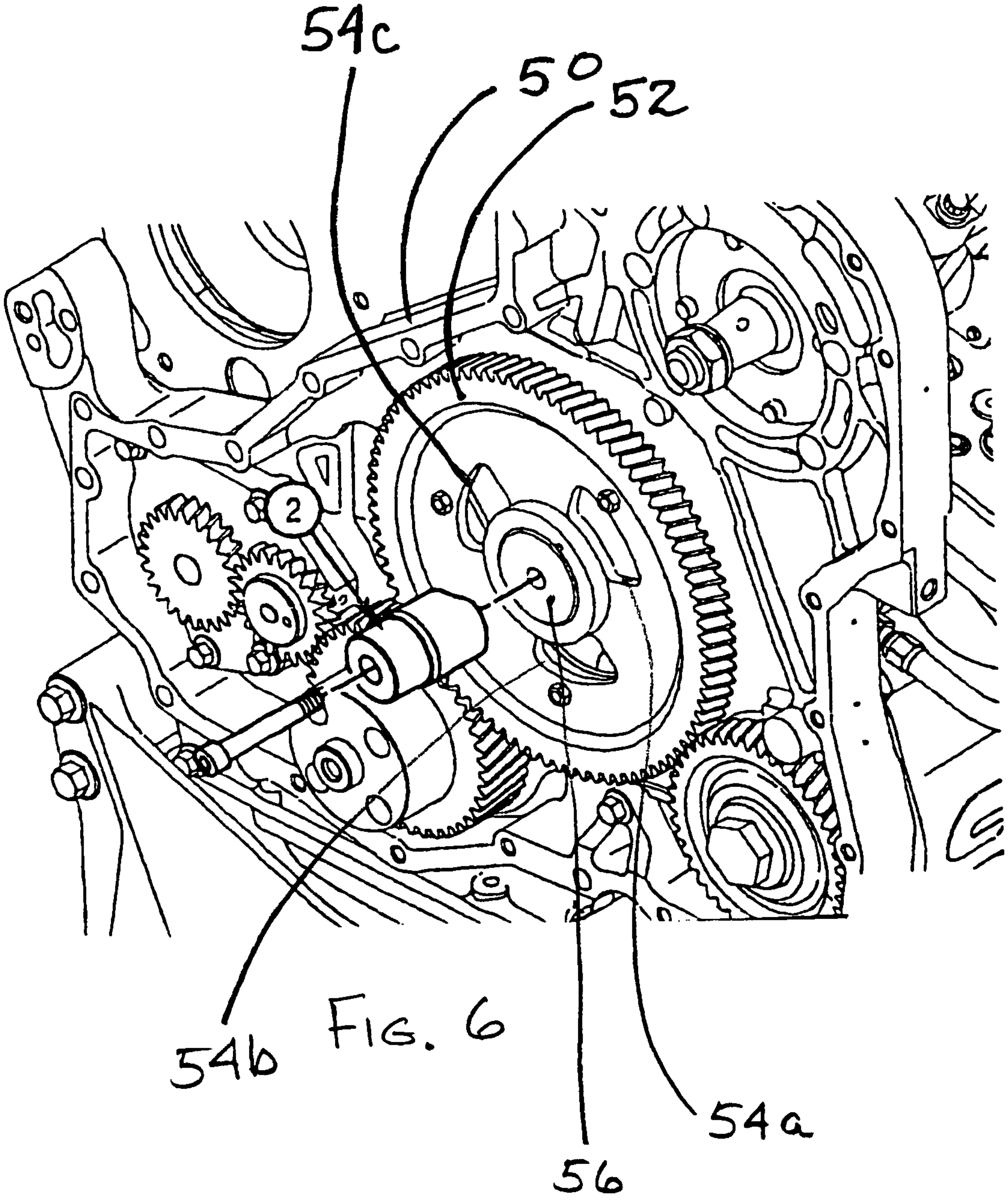
FIG. 6 is a front perspective view of an engine having a gear to be pulled.
Figure 7:
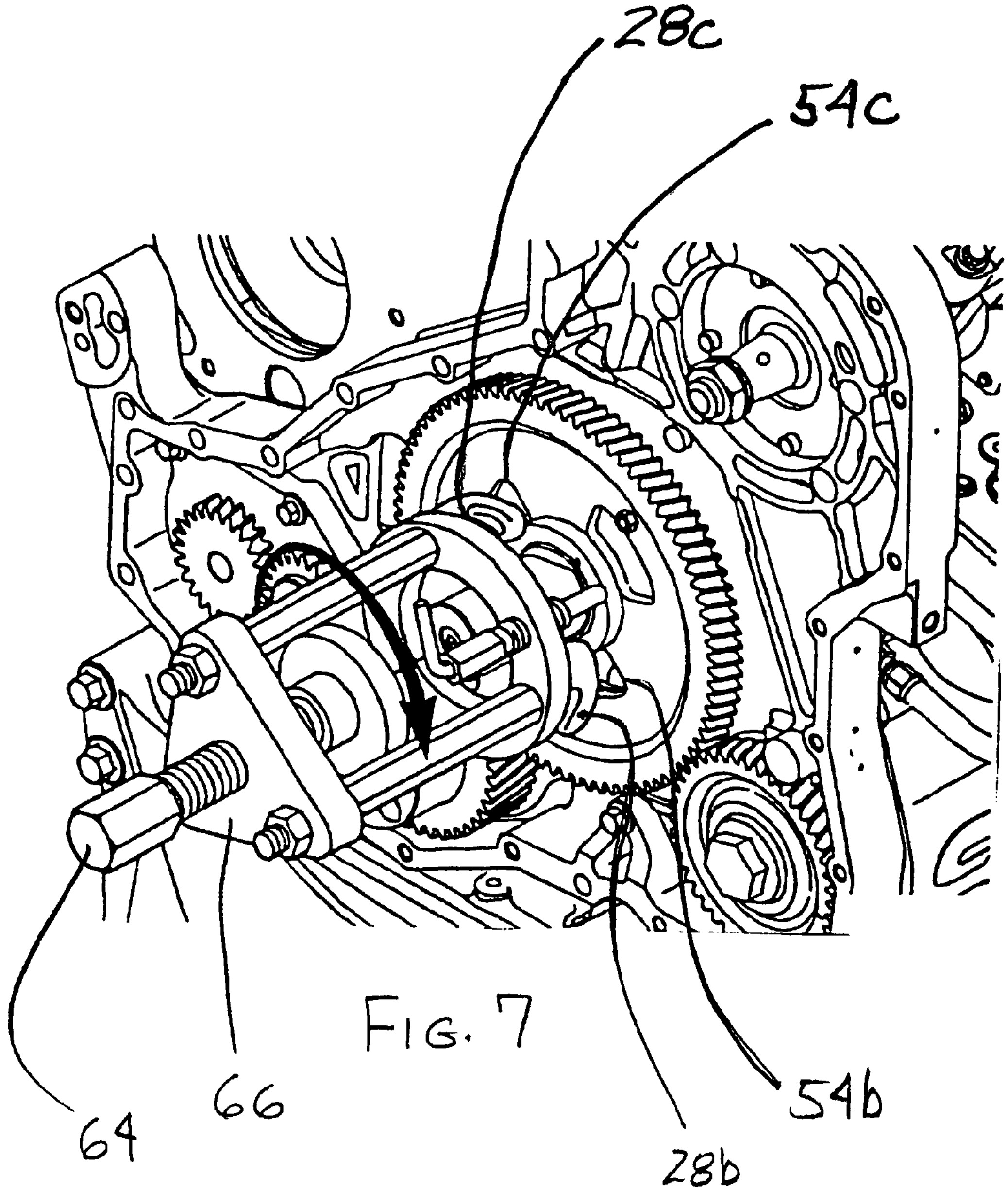
FIG. 7 is a view of the assembly of FIG. 6 including a gear pulling assembly according to one embodiment of the present invention.
Figure 8:
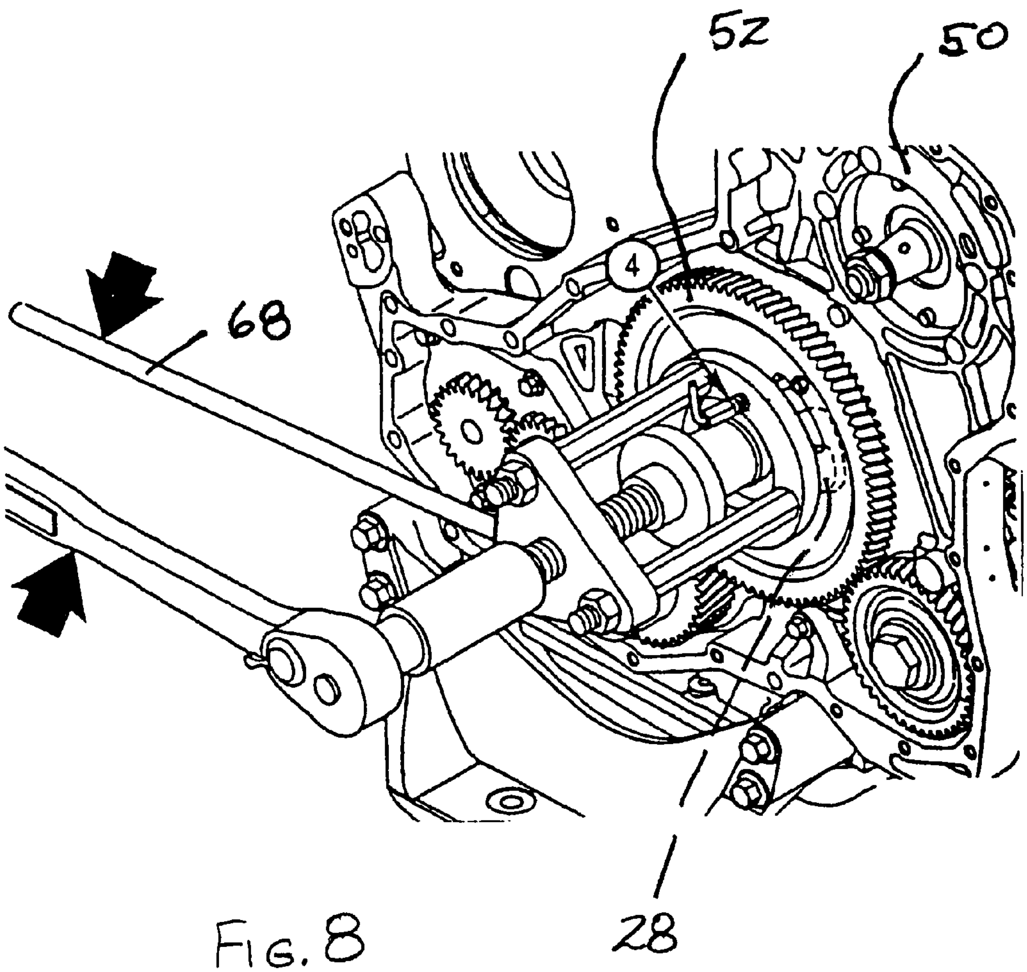
FIG. 8 is a view of the apparatus of FIG. 7 installed on a gear of an engine.

FIGS. 6, 7, and 8 each show various stages in which apparatus and methods according to one embodiment of the present invention are employed. FIGS. 6-8 each include an engine 50, such as a diesel engine. Engine 50 includes one or more gears 52 which are press-fit onto one end of a shaft 56. In one embodiment, gear 52 is a camshaft gear, and shaft 56 is the camshaft for engine 50. Gear 52 further includes one or more features 54 which are adapted and configured for coupling with mounting lugs 28. For example, camshaft gear 52 includes lightning holes 54*a,* 54*b,* and 54*c*. These lightning holes 54 are shown equally spaced about the web of gear 52. Although a plurality of equally-spaced lightning holes have been shown and described, the present invention contemplates mounting lugs 28 which interface with other types of component features, (for example, holes of any spacing).

What follows now is a description of a method according to one embodiment of the present invention for removing a component press-fit onto another component.

Referring to FIG. 5, install the studs 38 into the member 22. Hand tighten the studs. Install the replacer screw member 66 on the studs 38. Install the nuts 65 onto the studs 38 and hand tighten. Install the spring plungers 26, if required.

Referring to FIG. 6, loosen the thrust plate capscrews approximate two turns. Rotate the camshaft gear until the keyway is located at the 1-o'clock position. Place the shaft pilot 62 on the end of the shaft 56. Install the socket head capscrew 64 and hand tighten.

Referring to FIG. 7, install the assembly 60 onto the gear 52. Rotate clockwise until the lugs 28 of member 22 are fully engaged in the corresponding gear feature 54.

Referring to FIG. 8, install the handle 68 in the replacer assembly 60. Using a wrench, turn the fastener 64 clockwise while holding the handle 68 to prevent gear rotation and remove the gear 52.

The 3-lugs 28 on the member 22 are inserted in the clamping features 54 of the gear 52, and then rotated into position behind the gear 52. Installation of the tool is accomplished from the front side of the gear and does not require partially or fully removing the shaft. The preferably large size of the lugs also provides for a positive engagement of the member 22. This member 22 resists slipping off the gear. Some embodiments of the invention include a spring-loaded pin 26 that locks the member 22 to the gear 52 and insures that the lugs 28 are correctly positioned behind the gear 52.

In these embodiments, plunger 26 is biased toward the gear to be pulled and biased away from the pilot. As the attachment member is brought into proximity with the web of the gear, and when the lugs 28 are positioned in the corresponding apertures, the plungers 26 are forced toward the pilot. This extension of the plunger away from the gear provides full indication that the lugs 28 are positioned in and through the corresponding gear aperture. In those embodiments in which the circumferential or angular extent 40 of the lug (see FIG. 2) is about the same as the circumferential or angular extent of the corresponding gear aperture, the end 26.3 of the plunger (see FIG. 1) rides upon the face of the gear web. However, when attachment member 22 is subsequently rotated so that the corresponding portions of the gear web are located within the corresponding slots of the lugs, plunger end 26.3 will no longer be supported by the web face, and the biasing spring of the plunger will cause the plunger end 26.3 to extend through the web aperture. In these embodiments, this dropping through of the plunger end 26.3 into and through the web aperture provides a visual and audible indication that the attachment member 22 has been properly rotating into place, such that the corresponding lugs are positioned to pull the gear from the shaft. Further, since in some embodiments there is a biasing spring which maintains the pin in this extending position, it will not be possible to rotate the attachment member out of position without pulling back on each plunger to allow the attachment member 22 to rotate in the opposite direction in order to be removed from the gear.

Figure 9:
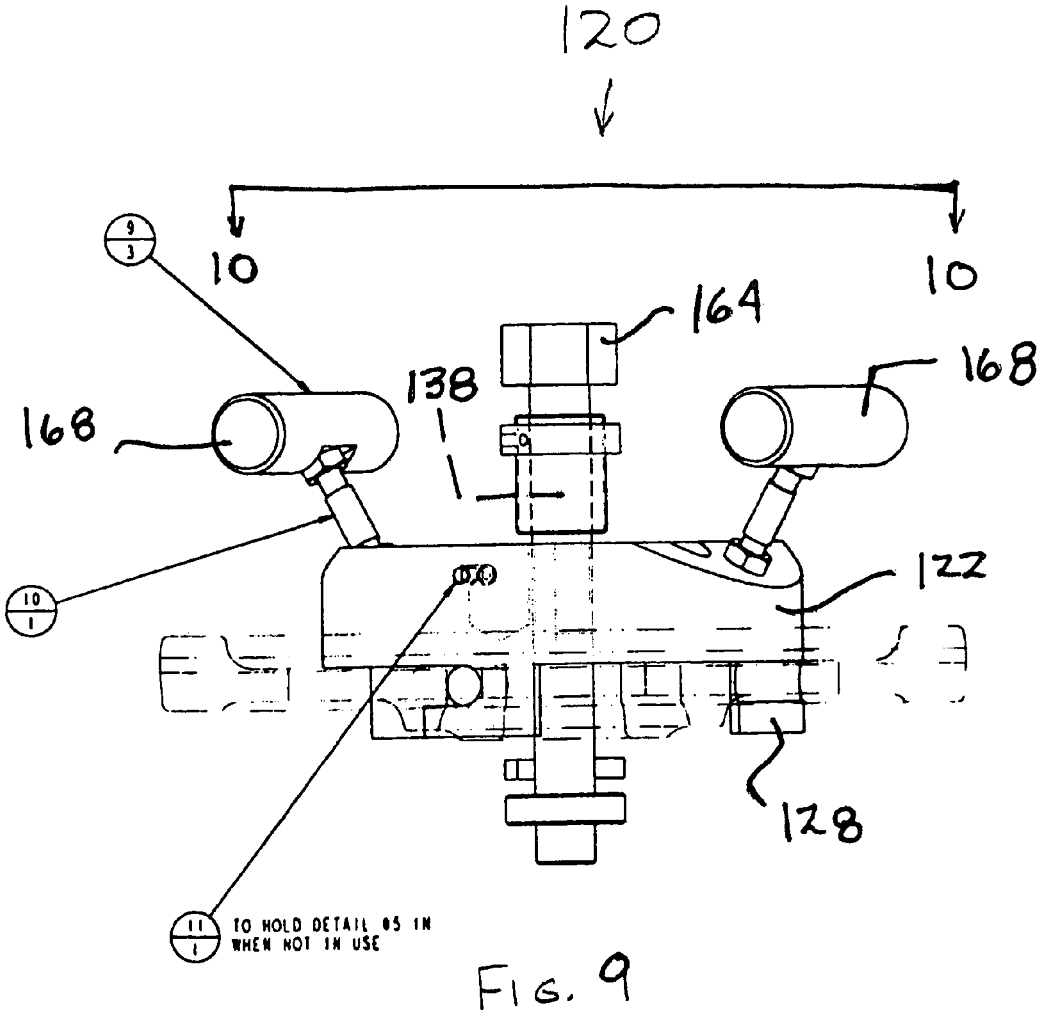
FIG. 9 is a side elevational view a gear pulling assembly according to another embodiment of the present invention.
Figure 10:
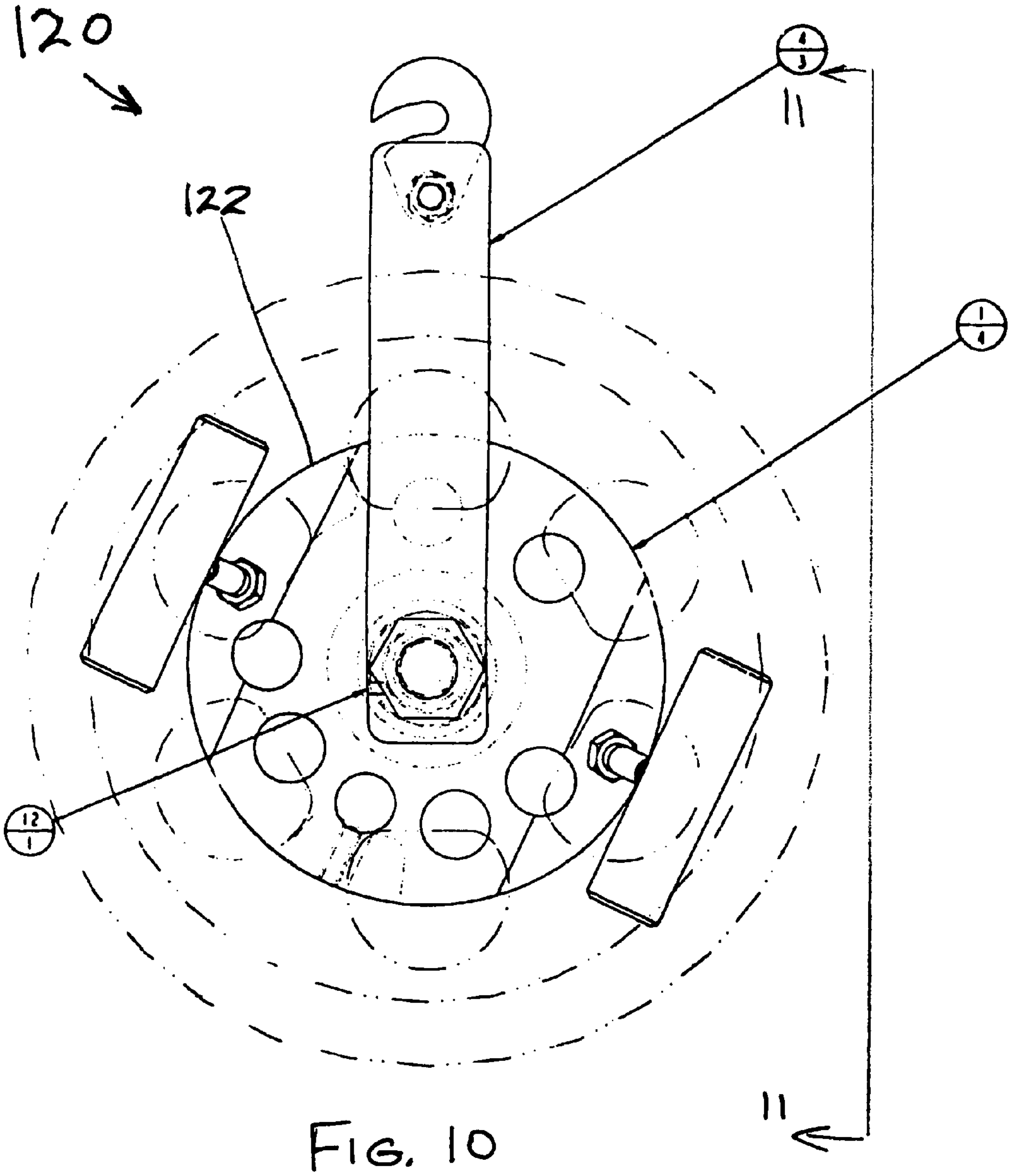
FIG. 10 is a view of the apparatus of FIG. 9 as viewed along line 10-10 of FIG. 9.
Figure 11:
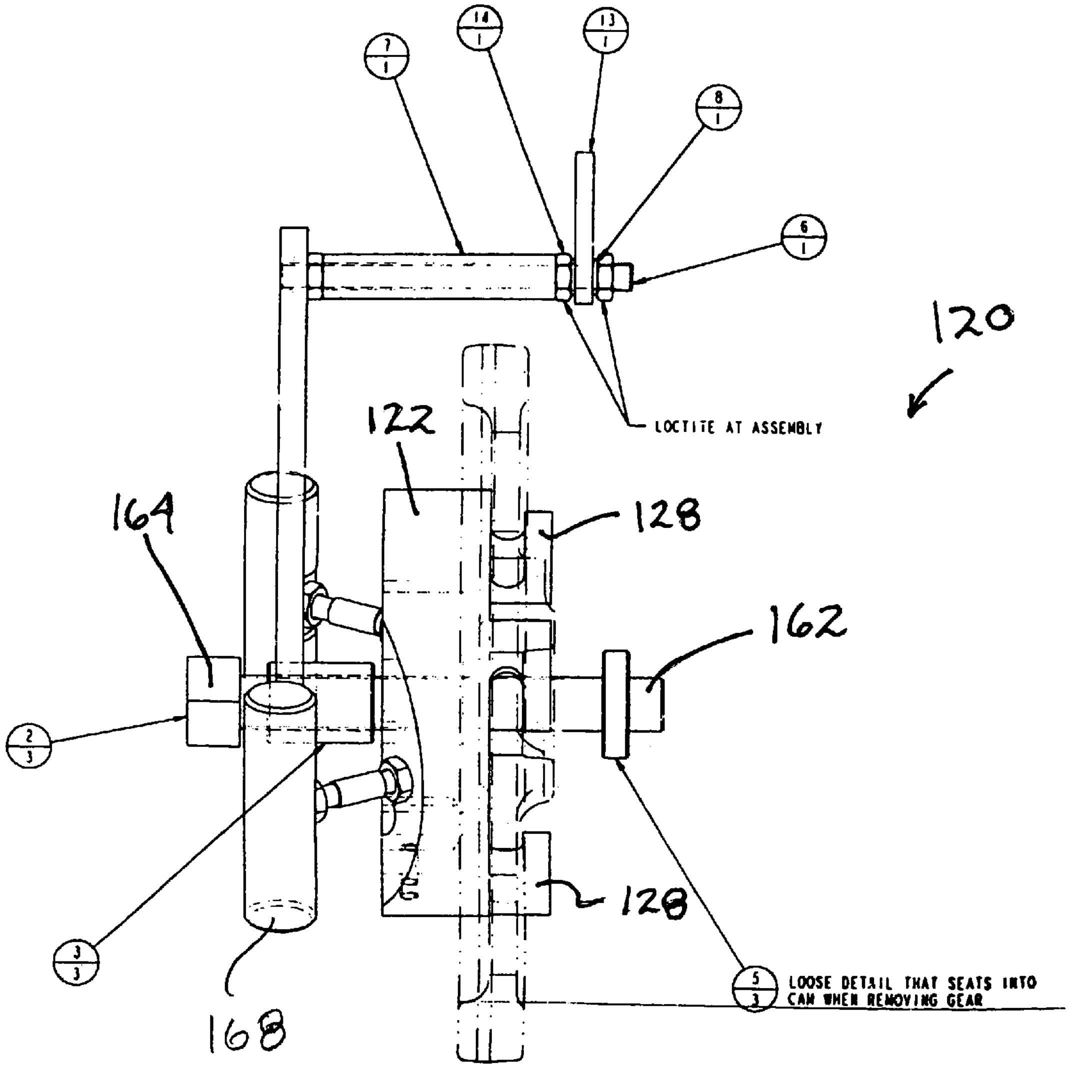
FIG. 11 is a view of the apparatus of FIG. 10 as viewed along line 11-11 of FIG. 10.

FIGS. 9, 10 and 11 depict various orthogonal views of a gear removal assembly 120 according to another embodiment of the present invention. The use of a one hundred prefix (1xx) before an element number (xx) denotes an element that is the same as the non-prefixed element number (xx), except for the differences shown and described.

As best seen in FIG. 10, the concentric-circles indicate the outer diameter for different assemblies 120 each sized to pull different sizes of components.

While the invention has been illustrated and described in detail in the foregoing description, the same is to be considered as illustrative and not restrictive in character, it being understood that only the preferred embodiments have been described and that all changes and modifications that come within the spirit of the invention are desired to be protected.

What is claimed is:

1. An apparatus for removing a gear having a web with a plurality of apertures and attached to a shaft, comprising:

an attachment member having a face and having plurality of lugs extending from the face, wherein each said lug comprises a transition member perpendicular to the face and a finger member coupled to and extending from the transition member, each said lug positioned on the face and adapted and configured to fit through a corresponding aperture in the gear web, each said finger and the face of said attachment member coacting to define a plurality of slots, each slot including a gap that is larger than the thickness of the web, each slot extending in a generally circumferential direction; and a pilot member threadably engaged to said attachment member for contacting the end of the shaft.

2. The apparatus of claim 1 wherein the aperture has a width, and which further comprises a plurality of pins slidable through the face of said attachment member, each said pin being spaced apart from a corresponding lug by a distance less than the width.

3. The apparatus of claim 1 wherein each said slot is open on one end to permit angular rotation of said lugs in the apertures of the gear, and at least one said slot is closed on the other end to limit the angular rotation of said lugs in the apertures of the gear.

4. The apparatus of claim 1 wherein said attachment member includes a central aperture and said lugs are equally spaced around the circumference of the aperture.

5. The apparatus of claim 1 wherein said attachment member includes a central aperture, said lugs are spaced around the periphery of the aperture, and each said finger is oriented in the same circumferential direction.

6. An apparatus for removing a gear having a web with a plurality of apertures and attached to a shaft, comprising:

an attachment member having a face and having plurality of lugs extending from the face, wherein each said lug comprises a transition member perpendicular to the face and a finger coupled to and extending from the transition member, each said lug positioned on the face and adapted and configured to fit through a corresponding aperture in the gear web, each said finger extending in a generally circumferential direction;

a pilot member threadably engaged to said attachment member for pushing against the end of the shaft; and a plurality of pins slidably coupled to said attachment member, each said pin being slidable through a corresponding hole through said attachment member, each said pin being spaced apart from a corresponding lug by a distance less than the width of the corresponding aperture.

7. The apparatus of claim 6 wherein each said pin is biased to project through the corresponding hole.

8. The apparatus of claim 6 wherein each said finger and the adjacent face coact to define a plurality of slots, and each said slot is open on one end to permit angular rotation of said lugs in the apertures of the gear, and at least one said slot is closed on the other end to limit the angular rotation of said lugs in the apertures of the gear.

9. The apparatus of claim 6 wherein said attachment member includes a central aperture and said lugs are equally spaced around the circumference of the aperture.

10. The apparatus of claim 6 wherein said attachment member includes a central aperture, said lugs are spaced around the periphery of the aperture, and each said finger is oriented in the same circumferential direction.

11. An apparatus for removing a gear having a web with a plurality of apertures and attached to a shaft, comprising:

an attachment member having a face and having a plurality of lugs extending from the face, each said lug positioned on the face and adapted and configured to fit through a corresponding aperture in the gear web, each said lug including a transition member perpendicular to the face and a finger which is coupled to and extends from the transition member in a generally circumferential direction, said attachment member including a central opening;

a pilot member adapted and configured to fit through the central opening of said attachment member for pushing against the end of the shaft; and at least one spring-loaded pin coupled to said attachment member, said pin being slidable through a corresponding hole through said attachment member, said pin being biased to extend through the hole;

wherein said pin has an end and the end extends through an aperture when the lugs are coupled to the web and prevent removal of said attachment member from the gear.

* * * * *